US006729489B2

United States Patent
Sanderson

(10) Patent No.: US 6,729,489 B2
(45) Date of Patent: May 4, 2004

(54) TUBE CASE

(75) Inventor: David B. Sanderson, Villa Park, CA (US)

(73) Assignee: SKB Corporation, Orange, CA (US)

( * ) Notice: Subject to any disclaimer, the term of this patent is extended or adjusted under 35 U.S.C. 154(b) by 75 days.

(21) Appl. No.: 10/216,116

(22) Filed: Aug. 8, 2002

(65) Prior Publication Data

US 2003/0222082 A1 Dec. 4, 2003

Related U.S. Application Data

(63) Continuation-in-part of application No. 29/161,632, filed on May 30, 2002.

(51) Int. Cl.$^7$ ................................................ B65D 6/00
(52) U.S. Cl. ..................... 220/8; 220/324; 220/4.03; 206/315.4
(58) Field of Search ................. 220/8, 324, 4.03; 206/315.4, 315.2; 150/159

(56) References Cited

U.S. PATENT DOCUMENTS

| 357,206 | A | | 2/1887 | Kamp |
|---|---|---|---|---|
| 2,143,720 | A | | 1/1939 | Smith |
| 2,919,017 | A | | 12/1959 | Weber |
| 2,935,186 | A | | 5/1960 | Clark |
| 3,057,464 | A | | 10/1962 | Baggott, Sr. |
| 3,175,853 | A | * | 3/1965 | Gilbertson ................. 292/86 |
| 3,179,243 | A | * | 4/1965 | Ashcroft ................... 206/527 |
| D226,407 | S | | 2/1973 | Doman |
| 3,744,687 | A | | 7/1973 | Oreck |
| 3,837,548 | A | | 9/1974 | Nerger |
| 4,161,268 | A | * | 7/1979 | Heil ........................ 206/315.1 |
| 4,361,947 | A | * | 12/1982 | Arnaud ........................ 29/416 |
| 4,380,290 | A | | 4/1983 | Luebke |
| 4,596,340 | A | | 6/1986 | Luther |
| 4,643,302 | A | | 2/1987 | Baumgardner |
| 4,961,497 | A | | 10/1990 | Sherer et al. |
| D312,531 | S | | 12/1990 | Sherer et al. |
| 5,005,743 | A | * | 4/1991 | Ramsay ..................... 224/601 |
| 5,076,428 | A | | 12/1991 | Shaw |
| D362,115 | S | | 9/1995 | Moneta |
| 5,450,956 | A | | 9/1995 | Peckenpaugh, Sr. et al. |
| D392,801 | S | | 3/1998 | Hields et al. |
| 5,829,591 | A | | 11/1998 | Lyons |
| 5,934,464 | A | | 8/1999 | Vargo et al. |
| D414,035 | S | | 9/1999 | Stokes |
| 6,062,382 | A | | 5/2000 | Czerkie |
| D436,440 | S | | 1/2001 | Stokes |

* cited by examiner

Primary Examiner—Joseph Man-Fu Moy
(74) Attorney, Agent, or Firm—Orrick, Herrington & Sutcliffe LLP

(57) ABSTRACT

There is disclosed herein a tube case having first and second sections wherein the open ends of the two sections can be slid together to provide a carrying case for elongated items, such as fishing rods, rifles, golf clubs, golf bags and the like. One section is smaller in cross-section than the other such that the closed end of that section can be inserted into the open end of the other section to provide a more compact assembly for storage and shipment. The sections of the tube case are designed so that a portion or an edge at the open end of the outer case abuts a shoulder on a latch plate or bracket on the other case to both provide a stop when the open ends of the two sections are placed together for carrying an article, and further to properly orient the ends of the two sections so that latches can be readily and simply engaged and latched to lock together the two sections.

12 Claims, 5 Drawing Sheets

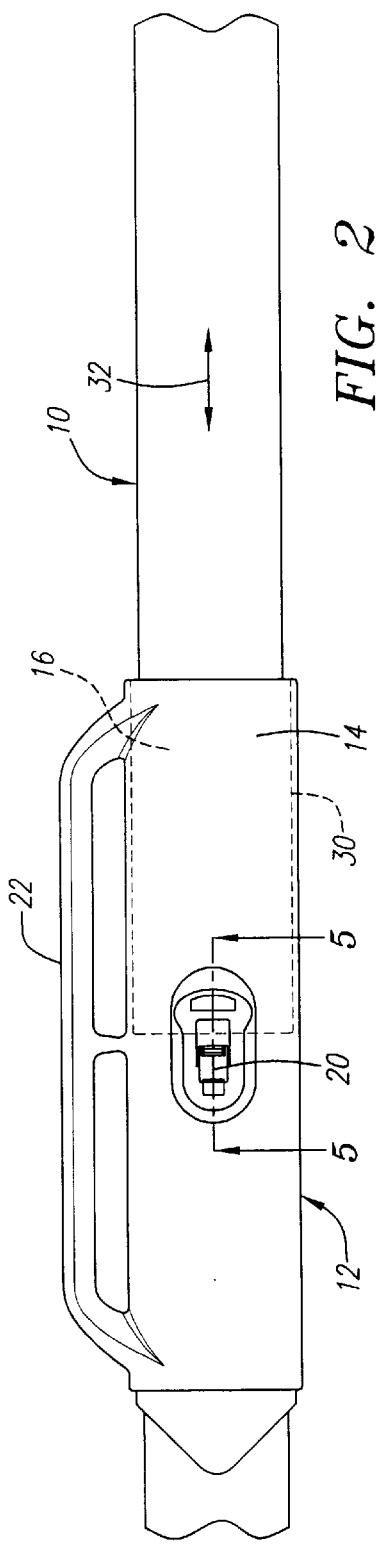
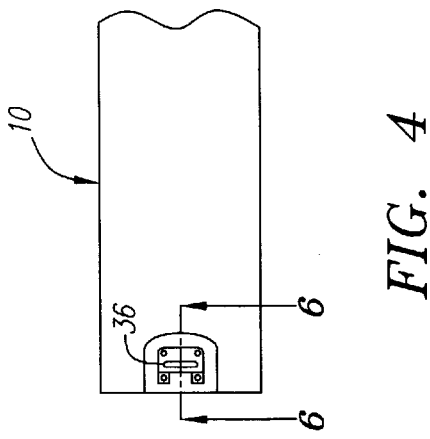
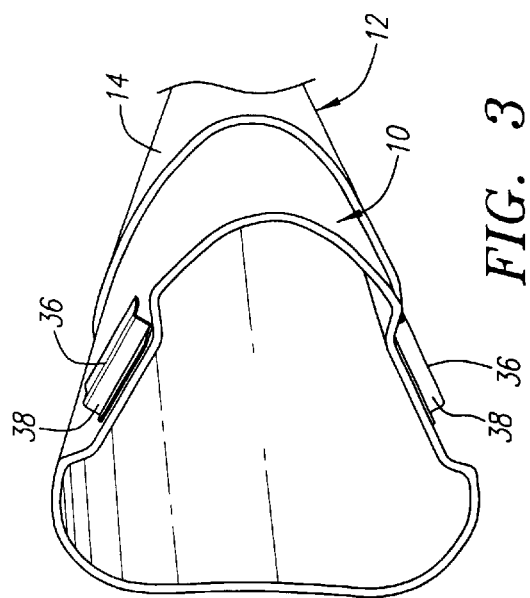

TUBE CASE

RELATED APPLICATION

This application is a continuation-in-part of design application Ser. No. 29/161,632 filed May 30, 2002, entitled TUBE CASE.

FIELD OF THE INVENTION

The present invention relates to cases, such as rigid cases for transporting and/or storing products. In particular, it is directed to an elongated two-section case wherein one section fits or telescopes within the other, and the sections of the cases are formed of a relatively rigid material, such as roto-molded polyethylene.

BACKGROUND OF THE INVENTION

Numerous forms of cases have been devised over the years, including soft sided cases and rigid wall cases. The most familiar forms of cases are suitcases, briefcases, roll-on carrying cases, golf club cases and golf club traveling cases, and the like. A need exists for a relatively strong and lightweight case for transporting elongated items, such as fishing poles, golf clubs, rifles and various and sundry other elongated devices that need protection from the elements and from damage, such as while being transported in the baggage compartment of an airplane.

SUMMARY OF THE INVENTION

The present invention relates to a relatively rigid case formed in two telescoping sections wherein the end of one section fits within the end of another section to form the overall elongated case. A relatively simple latching assembly is provided, along with the manner in which the two case sections are configured, to allow an end of one section to abut against a latch plate affixed to the other section to act as a stop or stops, and to enable the two sections to be simply, efficiently and strongly latched together. In this manner, the two sections overlap thereby providing a strong central section to the assembled case. Another aspect of the present invention is that the closed end of the smaller section is configured to almost totally fit within the open end of the larger section to provide a relatively compact case assembly for shipment, storage, warehousing and the like.

More specifically, according to an exemplary embodiment, each section has a closed end and an open end. In assembling the case for use, to contain or hold an article, such as a fishing rod, golf clubs or the like, the two open ends are mated in the manner noted above and latched together to provide an elongated carrying case for the article. On the other hand, in the case of just storage and/or shipment of the case itself, the closed end of one section is inserted into the open end of the other section, with the two sections telescoped together thereby resulting in a relatively compact assembly only slightly longer than one of the sections.

Accordingly, it is an object of the present invention to provide an improved form of case.

Another object of the present invention is to provide a relatively rigid and lightweight elongated carrying case having a simple latching mechanism for securing together sections of the case for carrying a product or products therein.

A further object of the present invention is to provide a tube case having two sections, one of which can be stored in the other for relatively compact storage and shipment.

BRIEF DESCRIPTION OF THE DRAWINGS

These and other objects and features of the present invention will become better understood through a consideration of the following description, taken in conjunction with the drawings in which

FIG. 2 is a partial elevational view showing in phantom lines how the open end of one section fits within the open end of the other.

FIG. 3 is an end view of the sections showing the triangular configuration thereof and the location of the latch brackets.

FIG. 4 is a partial elevational view particularly illustrating the placement of latch bracket.

DETAILED DESCRIPTION

Figure 1:
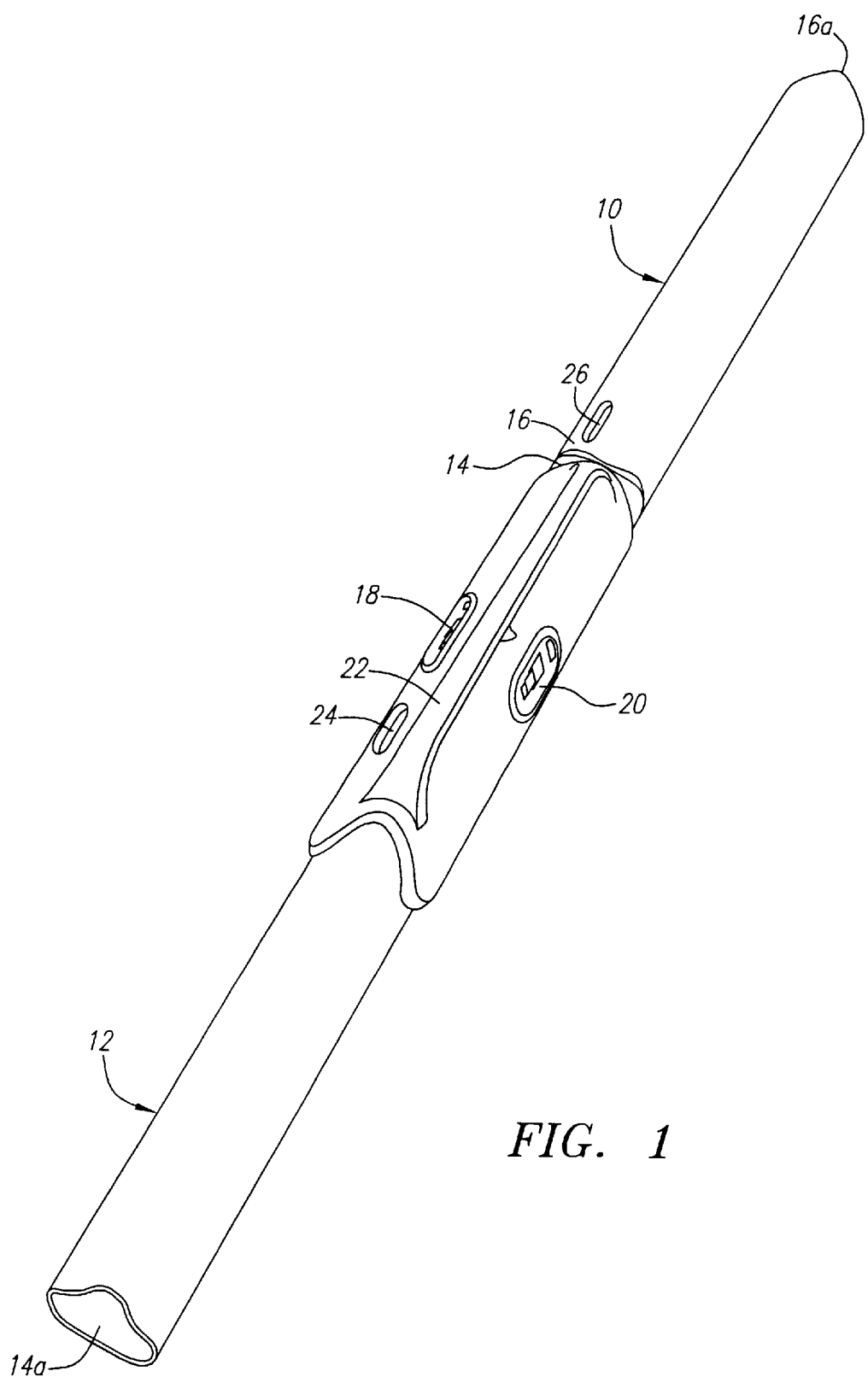
FIG. 1 is a perspective view of an embodiment of a tube case according to the present invention.
Figure 5:
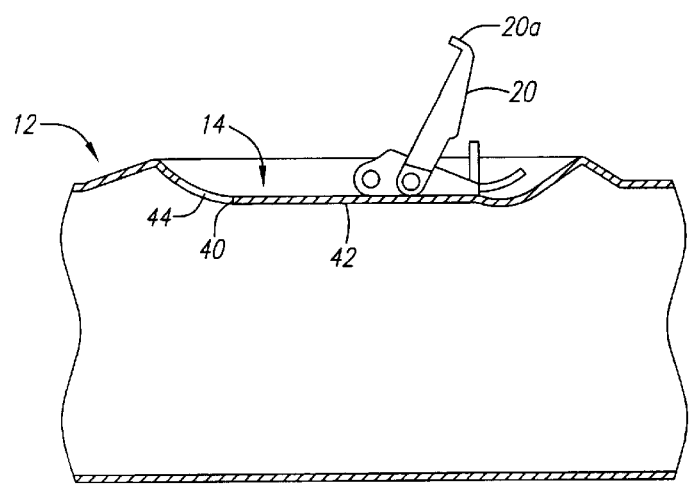
FIG. 5 is a cross-sectional view of one section illustrating the placement of a latch.

Turning now to the drawings and first to FIG. 1, a first embodiment of a tube case is generally illustrated including a first outer section 12 and a second inner section 10. These sections preferably are substantially triangular in cross-section (note FIG. 3). As will appear subsequently, the second section 10 is slightly smaller than the first section 12 such that the open ends at 14 and 16 can mate together wherein the end 16 of section 10 is slid into the end 14 of section 12 to provide the composite case as seen in FIG. 1. First and second latches 18 and 20 are affixed to the larger outer section 12 to mate through openings in section 12 with latch brackets or plates (not shown in FIG. 1) in a manner to be described subsequently. The section 12 preferably includes a handle 22, and hooks 24 and 26 can be provided on the respective sections 12 and 10 to which a strap (not shown) or other carrying device can be affixed. The sections 12 and 10 have respective closed ends 14a and 16a.

Each of the tube sections 10 and 12 is preferably roto-molded of polyethylene which has a natural lubricity that enables the ends 14 and 16 of the tube sections to readily slide together and apart. A tube case of the type shown in FIG. 1 is particularly useful for fishing rods, but can also be used for microphone stands, rifles, and other elongated articles, and a larger version as will be described later (FIG. 9) can be used as a golf bag/golf club case or the like.

Figure 6:
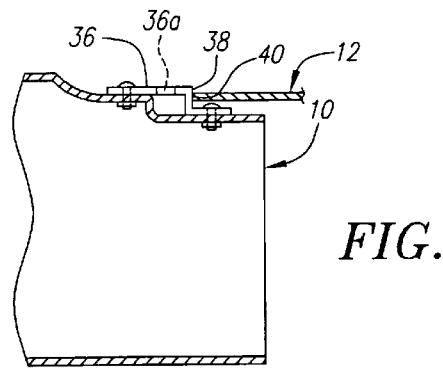
FIG. 6 is a detailed partial cross-sectional view of the latch plate bracket.
Figure 7:
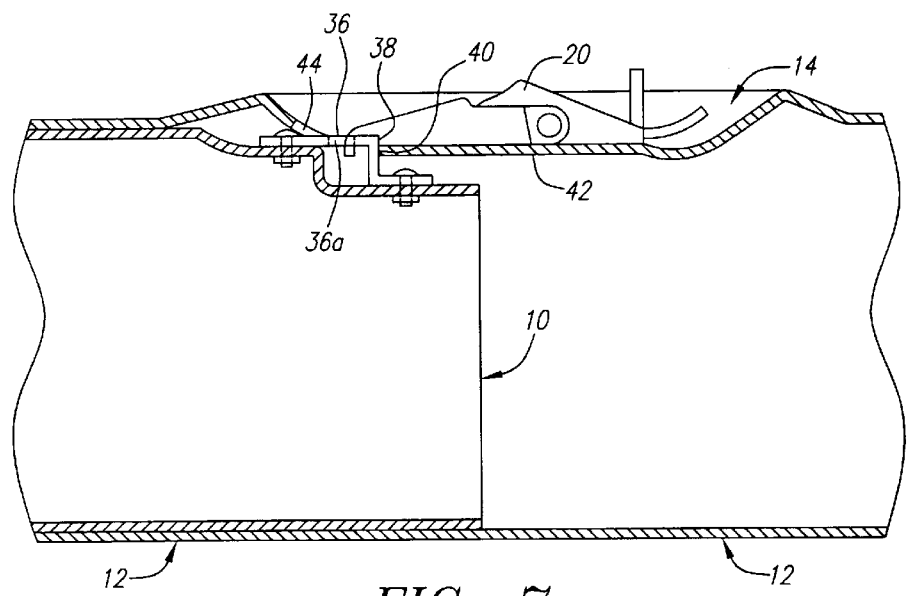
FIG. 7 is a detailed cross-sectional view illustrating the manner in which the open ends of the two sections fit together and one latch and latch bracket cooperate to lock the sections together.
Figure 8:
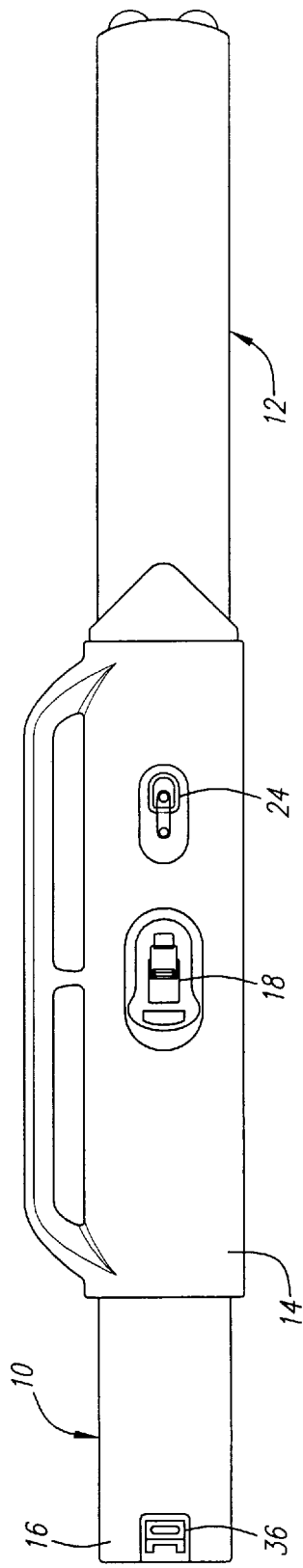
FIG. 8 is a side elevational view showing the two tube sections telescoped together for shipment or storage.

Turning now to the more detailed FIGS. 2 through 8, and first to FIG. 2, the latter illustrates the two sections 10 and 12, and particularly shows in dashed lines 30 how the open end 16 of tube section 10 fits within the open end 14 of the slightly larger tube section 12 and extends therein to the vicinity of the latch 20. An arrow 32 generally illustrates how the tube section 10 is axially moved with respect to the tube section 12 in and out to either form the closed tube case as seen in FIGS. 1 and 2 or to allow the section 10 to be removed from Section 12 so that the closed end 16a of section 10 can be inserted into the open end 14 of section 12 to provide a compact case assembly for storage and shipment (FIG. 8).

Of particular importance is the manner in which a "stop" is provided when the open ends 16 and 14 of the sections 10 and 12 are brought together so that the ends of both sections are properly placed to enable the latches 18 and 20 to secure together the two sections. Basically, the inner tube 10 has at the open end 16 thereof a pair of latch brackets or plates 36 that each provides a shoulder 38 as best seen in FIGS. 6 and 7 against which a pair of edges 40 near the open end 14 of the larger tube section 12 abut, only one edge 40 of an indented area 42 having an aperture 44 being seen in FIGS. 5–7. Thus, the edges 40 on two sides of the triangular cross-section of the larger outer tube section 12 abut the respective shoulders 38 of the latch brackets 36 on the mating two sides of the triangular inner section 10.

The outer section 12 includes the pair of latches 18 and 20 affixed thereto at the indented areas 42, and the latch brackets 36 each have an aperture 36a (FIGS. 6–7) into which a finger 20a of latch 18 or 20 fits to lock the two sections 10 and 12 together as seen in FIGS. 1, 2 and 7, to provide the closed and latched elongated carrying case. This provides a very simple arrangement whereby the open end 16 of the smaller tube section 10 can be simply inserted into the open end 14 of the larger tube section 12 and slid down to where the bracket shoulders 38 on the two sides of the section 10 engage or abuts the edges 40 of section 12 to simply provide a stop for properly mating the open ends of the two sections 10 and 12 and to provide a proper placement of latch brackets 36 with respect to the fingers 20a of the latches so that these fingers can engage the apertures 36a of the respective latch brackets 36 to readily and simply latch the two sections 10 and 12 together.

Although not shown, any suitable form of padding can be provided within one or both sections 10 and 12, and particularly at the insides of the closed ends 14a and 16a thereof.

FIG. 8 shows the two sections 10 and 12 slid together with section 10 within section 12 for storage or shipment of the case.

Figure 9:
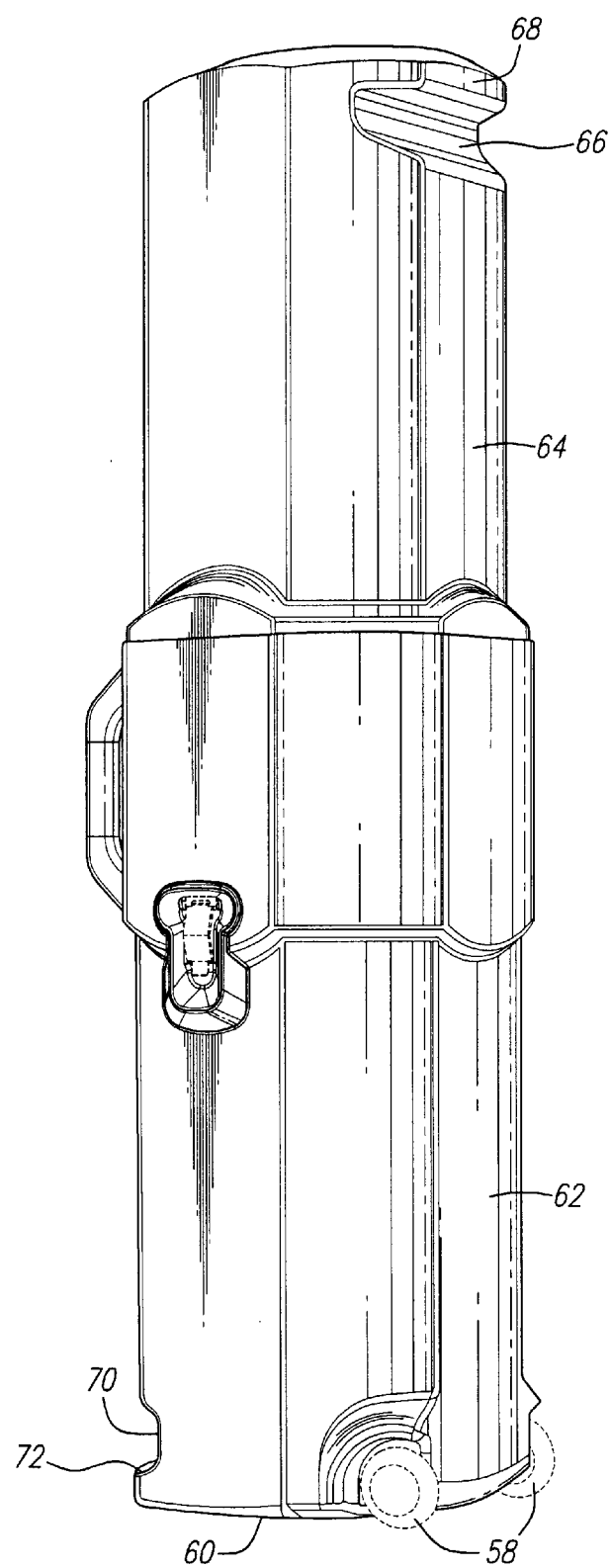
FIG. 9 is a perspective view of another, larger embodiment of tube case such as for transporting a golf bag and golf clubs.

FIG. 9 illustrates a second embodiment of a tube case according to the present invention and which is relatively larger inside so as to hold and carry large items, for example, a golf bag with golf clubs in the bag. The structure thereof with regard to the latches and latch plates, as well as the manner in which an edge at the open of the outer tube engages a shoulder on the latch plates of the inner tube is the same as shown and described above. Significantly, and particularly because the case in this embodiment is larger, it preferably includes a pair of wheels 58 disposed at the bottom 60 of the outer section 62. The smaller section 64 preferably includes an indented area 66 at the top thereof forming a handle 68 to enable the overall tube case of FIG. 9 to be simply moved on two wheels 58 much like with a conventional hand truck.

Furthermore, the lower end 60 of the larger section 62 includes an indented area 70 providing a "foot hold" 72. The purpose of this is to allow the user's foot to be placed on the foot hold 72 as the smaller section 64 is pulled upwardly or separated from the larger section 62. In all other respects, the structure and design of this embodiment of the tube case, including material and method of construction, are the same as for the previous embodiment.

In both embodiments, it should be noted that where the two tube sections slide together there are thus two layers of plastic, essentially in the middle of the overall tube case. This provides a particularly strong and sturdy case design because of the double thickness of the case in the middle forming a strong "band." Furthermore, the ability to slide the smaller section 10 into the larger section 12 for storage and shipment is particularly important from the standpoint of required storage space as well as to reduce the bulk of the case for shipment. It will be appreciated that if the cases of the present invention could only be stored and shipped when assembled together and latched as seen in FIGS. 1 and 9 that the required storage space and shipping space would be approximately double what is involved with the present design wherein the closed end of the smaller tube is inserted into the open end of the larger tube as seen in FIG. 8.

While embodiments of the present invention have been shown and described, various modifications may be made without departing from the scope of the present invention, and all such modifications and equivalents are intended to be covered.

What is claimed is:

1. A tube case comprising first and second sections each having an open end and a closed end, the first section being larger in cross-section than the second section to allow the open end of the second section to fit within the open end of the first section to thereby provide a tube case for containing and supporting therein an elongated article, the second section including a latch bracket with a shoulder thereon and a slot therein near the open end thereof, the first section having a portion thereof at the open end thereof for engaging the shoulder on the latch bracket to provide a stop and proper positioning of the open end of the second section within the open end of the first section, and the first section including a latch with a member adapted to engage the slot in the latch bracket.

2. A tube case as in claim 1 wherein the first and second sections have a substantially triangular cross-sectional configuration.

3. A tube case as in claim 1 including a pair of latch brackets on the second section, each with a shoulder and slot whereby the portion of the first section can engage both shoulders of both brackets.

4. A tube case as in claim 1 wherein the first section includes a carrying handle.

5. A tube case as in claim 4 wherein the sections each include a bracket to which a carrying strap can be attached.

6. A tube case as in claim 1 wherein the sections are dimensioned to hold an elongated article such as a fishing rod or the like.

7. A tube case as in claim 1 wherein the sections are dimensioned to hold a golf bag.

8. A tube case as in claim 1 wherein the first and second sections are dimensioned so that the closed end of the second section can fit within the open end of the first section for storage and shipment of the case.

9. A tube case comprising first and second sections each having an open end and a closed end, the first section being larger in cross-section than the second section to allow the open end of the second section to fit within the open end of the first section to thereby provide a tube case for containing and supporting therein an elongated article, the second section including a latch bracket with a shoulder thereon and a slot therein near the open end thereof, the first section having a portion thereof at the open end thereof for engaging the shoulder on the latch bracket to provide a stop and proper positioning of the open end of the second section within the open end of the first section, and the first section including a latch with a member adapted to engage the slot in the latch bracket.

10. A tube case as in claim 9 including a pair of latch brackets on the second section, each with a shoulder and slot whereby the edge of the first section can engage both shoulders of both brackets, and wherein the first and second sections have a substantially triangular cross-sectional configuration, and wherein the first and second sections are dimensioned so that the closed end of the second section can fit within the open end of the first section for storage and shipment of the case.

11. A tube case comprising first and second elongated sections each having an open end and a closed end, the first section being larger in cross-section than the second section to allow the open end of the second section to fit within the open end of the first section to thereby provide a tube case for containing and supporting therein an elongated article, the second section including a latch bracket thereon and a slot therein near the open end thereof, the first section having a portion thereof at the open end thereof for engaging the latch bracket to provide a stop and proper positioning of the open end of the second section within the open end of the first section, and the first section including a latch with a member adapted to engage the slot in the latch bracket.

12. A tube case as in claim 11 including a pair of latch brackets on the second section, each with a slot whereby the edge of the first section can engage both brackets, and wherein the first and second sections have a substantially triangular cross-sectional configuration, and wherein the first and second sections are dimensioned so that the closed end of the second section can fit within the open end of the first section for storage and shipment of the case.

* * * * *